(12) United States Patent
Habusha et al.

(10) Patent No.: US 10,977,192 B1
(45) Date of Patent: Apr. 13, 2021

(54) REAL-TIME MEMORY-PAGE STATE TRACKING AND ITS APPLICATIONS

(71) Applicant: Amazon Technologies, Inc., Seattle, WA (US)

(72) Inventors: Adi Habusha, Moshav Alonei Abba (IL); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 253 days.

(21) Appl. No.: 15/094,656

(22) Filed: Apr. 8, 2016

(51) Int. Cl.
*G06F 12/1036* (2016.01)
*G06F 12/1009* (2016.01)
*G06F 12/10* (2016.01)

(52) U.S. Cl.
CPC ...... *G06F 12/1036* (2013.01); *G06F 12/1009* (2013.01); *G06F 2212/681* (2013.01)

(58) Field of Classification Search
CPC ...... G06F 12/1036; G06F 12/10; G06F 12/00; G06F 12/1009
USPC .......................... 711/202, 206, 207, E12.061
See application file for complete search history.

(56) References Cited

U.S. PATENT DOCUMENTS

| | | | | |
|---|---|---|---|---|
| 5,754,818 A * | 5/1998 | Mohamed | ........... | G06F 12/1036 711/207 |
| 5,937,437 A * | 8/1999 | Roth | ................... | G06F 11/3409 711/202 |
| 6,038,661 A * | 3/2000 | Yoshioka | .................. | G06F 9/32 712/244 |
| 6,427,162 B1 * | 7/2002 | Mohamed | ........... | G06F 12/1036 711/E12.065 |
| 7,941,647 B2 * | 5/2011 | Yates, Jr. | ............ | G06F 9/30196 712/220 |
| 8,762,951 B1 * | 6/2014 | Kosche | .................... | G06F 8/443 717/127 |
| 9,378,150 B2 * | 6/2016 | Gupta | ................. | G06F 12/1027 |
| 2005/0268004 A1 * | 12/2005 | Kelley | .................... | G06F 9/451 710/56 |
| 2006/0015859 A1 * | 1/2006 | Sattler | ................... | G06F 40/284 717/143 |
| 2006/0184777 A1 * | 8/2006 | Mericas | ................ | G06F 9/3861 712/227 |
| 2010/0082918 A1 * | 4/2010 | Cong | .................... | G06F 3/0611 711/161 |
| 2011/0202724 A1 * | 8/2011 | Kegel | ................. | G06F 12/1081 711/118 |
| 2015/0331607 A1 * | 11/2015 | McCarthy | ............... | G06F 3/061 711/103 |

(Continued)

*Primary Examiner* — Tuan V Thai
*Assistant Examiner* — Edward Waddy, Jr.
(74) *Attorney, Agent, or Firm* — Weaver Austin Villeneuve & Sampson LLP

(57) ABSTRACT

Disclosed herein is an apparatus configured to log transactions of a translation lookaside buffer (TLB) into a software-accessible buffer. The apparatus includes a memory management unit (MMU) configured to translate a logical memory address to a physical memory address for accessing a physical memory. The apparatus also includes a TLB configured to store a plurality of entries, where each entry includes a logical memory page address and an associated physical memory page address. The apparatus further includes a software-accessible buffer and a TLB event logging circuit configured to detect an event associated with an entry of the TLB and store information regarding the detected event in the software-accessible buffer.

20 Claims, 8 Drawing Sheets

400

(56) References Cited

U.S. PATENT DOCUMENTS

2016/0246540 A1\*   8/2016   Blagodurov ........ G06F 12/0215
2017/0293567 A1\*  10/2017   Bryant ................ G06F 12/0815

\* cited by examiner

REAL-TIME MEMORY-PAGE STATE TRACKING AND ITS APPLICATIONS

BACKGROUND

In a modern computer system, an operating system often assigns physical memory to serve as virtual memory for various user applications. Using virtual memory in a computer system allows memory protection and the extension of physical memory beyond the main memory, such as dynamic random-access memory (DRAM), in a computer system. Thus, a processor generally runs user applications using virtual memory addresses. However, physical memory, such as a cache or main memory, is addressed using physical addresses. Therefore, a memory management unit (MMU) is usually used by a CPU to translate the virtual memory addresses to physical memory addresses before a physical memory can be accessed by the user application through the CPU. Similarly, for input/output (I/O) devices, such as graphic cards, an input/output memory management unit (IOMMU) may be used to translate device addresses into physical addresses in the main memory. In a virtualized environment, a hypervisor may assign host physical memory to a virtual machine, which may run a user application that uses guest virtual memory addresses. Thus, address translations may also be needed in the virtualized environment.

The translations between virtual memory addresses and physical memory addresses are usually stored in a page table in the main memory due to the size of the page table. However, accessing the page table in the main memory is not as fast as desired. To speed up the address translation, a MMU may store recent translation results into local buffers or caches called translation lookaside buffers (TLBs), which can be accessed much faster than the main memory.

BRIEF DESCRIPTION OF THE DRAWINGS

Various embodiments in accordance with the present disclosure will be described with reference to the drawings, in which.

DETAILED DESCRIPTION

Figure 1:
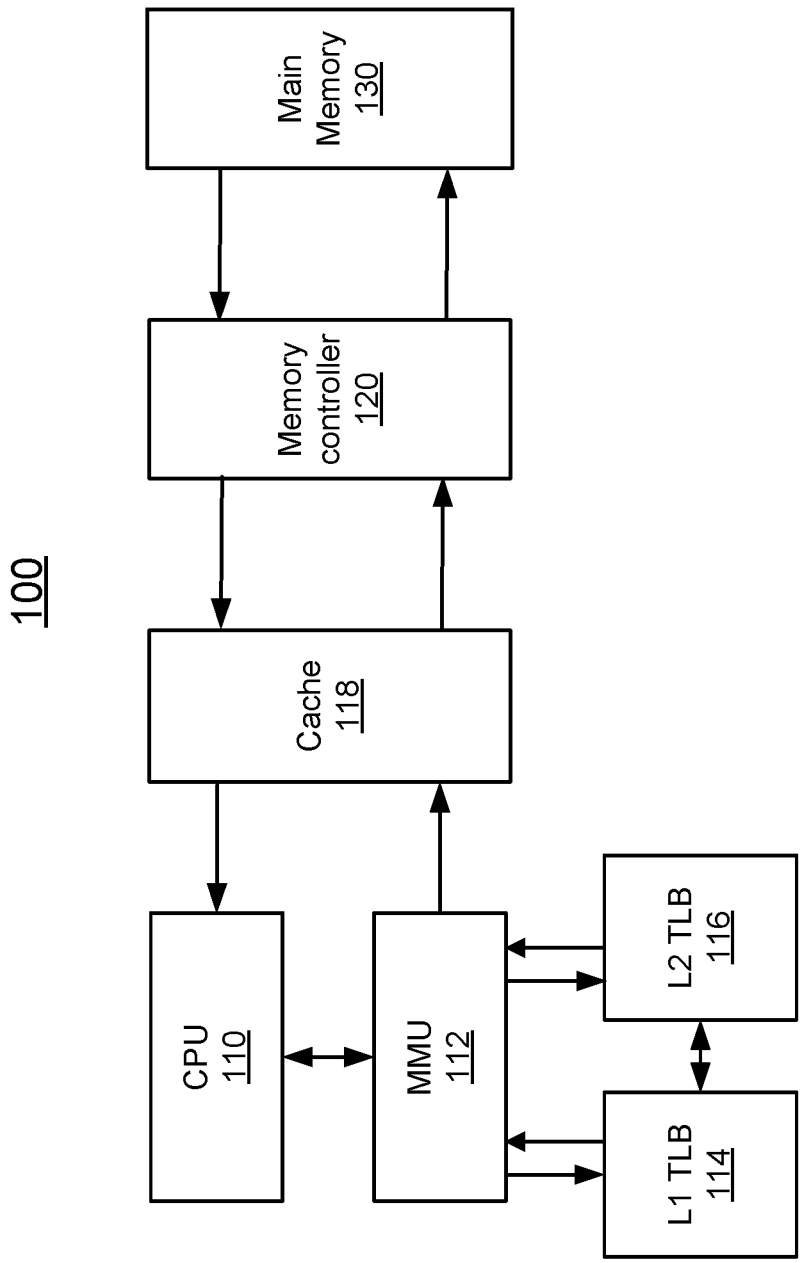
FIG. 1 is a block diagram of an example computer system.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In a computer system, translation lookaside buffers (TLBs) may be used to improve virtual address translation speed. Events occurring in TLBs, such as page faults, translation fills, and translation evictions, can provide useful information regarding memory usage in the computer system. However, the TLBs are generally not accessible by a software program. Even if the TLBs can be accessible by a software program, software intervention may be needed to log the events occurring in the TLBs.

Techniques described herein include adding a TLB event logging circuit and a software-accessible buffer to a memory management unit (MMU) that translates between a logical address and a physical address. The TLB event logging circuit can be configured to detect any type of event occurring in the TLB and store information related to the detected events in the buffer. A software program can then read the information stored in the buffer, and use the information to improve the performance and reduce the cost of a memory subsystem in a computer system. For example, techniques described herein allow events occurring in the TLBs for each central processing unit (CPU) to be logged by a hardware circuit into a buffer, such as a circular buffer, without software intervention. Based on the entries logged into the buffer, individual page activities may be tracked and profiled over time, which may then be used in various applications, such as cache replacement, compression of least used memory pages, and page swap, etc. The disclosed techniques may also be used in a virtual machine environment or an input/output (I/O) device.

As used herein, a logical address refers to an address at which an item, such as a memory cell, a storage element, or a network host, appears to reside from the perspective of an executing program. A logical address may be different from a physical address, and can be mapped or translated to a physical address. A logical address may be, for example, a virtual address or a device address.

A process is an instance of a computer program that is being executed. A process includes the computer program code and its current activity. Depending on the operating system, a process may include multiple threads of execution that execute instructions concurrently. Several processes may be associated with a same program. For example, several instances of the same program may be executed in more than one process.

A circular buffer (or a ring or cyclic buffer) refers to a memory device in which, when it is filled, new data is written at the beginning of the buffer and overwriting the oldest data.

Virtual memory is a memory management technique that can be used for various reasons, including freeing user applications from having to manage a shared memory space, improving security and memory protection due to memory isolation, extending physical memory beyond the main memory, and providing a contiguous address space visible by a process. The operating system of a computer system manages virtual address spaces and the assignment of physical memory to virtual memory. In a computer system using virtual memory, memory addresses used by a program are usually virtual addresses. However, data and instructions are stored in a physical memory, such as a dynamic random-access memory (DRAM) and caches, including a Level 1 instruction cache, a Level 1 data cache, a Level 2 cache, a Level 3 cache etc., using physical memory addresses. Thus, virtual memory addresses used by a program need to be translated into physical addresses for memory access. A memory management unit (MMU) may be implemented in a CPU to translate virtual addresses into physical addresses. The MMU can also be implemented as a separate circuit outside of the CPU.

Similarly, for I/O devices, device-visible virtual addresses, such as device addresses or I/O addresses, may be translated into physical memory addresses, rather than directly and physically addressing the physical memory, for reasons such as increasing security and memory protection through memory isolation, extending physical memory beyond the main memory, and providing a contiguous virtual address space. An input/output memory management unit (IOMMU) may be used to translate device addresses into physical addresses in the main memory.

In a virtualized environment, a guest operating system on a virtual machine manages guest physical memory by assigning a contiguous guest virtual memory space to an application running on the virtual machine. Only the guest virtual memory is visible to the application. Because a guest operating system is not aware of the virtualization, a hypervisor is also needed to manage host physical memory (machine memory) by mapping the machine memory to guest physical memory for a virtual machine. Thus, MMUs may be needed to map memory addresses between the guest virtual memory and the guest physical memory, and between the guest physical memory and the host physical memory.

The range of addresses used by a processor for a process is referred to as a virtual address space. A virtual address space can be divided into pages, each having a page size of, for example, a few kilobytes to a few megabytes. Most MMUs use a page table in the main memory for each process to map virtual page numbers in the virtual address space to physical page numbers in main memory. The page table may include one page table entry (PTE) for each page. Every time the CPU accesses a memory, a virtual address is translated into a corresponding physical address, which may require a walk in the page table for address translation and another physical memory access for the actual data access. Thus, using a page table in the main memory for address translation may not be as fast as desired.

To avoid accessing the main memory every time a virtual address is mapped and thus speeding up the memory access, an MMU may store recent translation results into a TLB. A TLB may be implemented as a content-addressable memory (CAM), where the search key is the virtual page number and the search result is a physical page number. If the requested virtual page number is present in the TLB, a match may be found quickly and the retrieved physical page number can be used to access memory.

FIG. 1 is a block diagram of an example computer system 100. Computer system 100 includes a CPU 110, a cache 118, a memory controller 120, and a main memory 130. Cache 118 may include, for example, a Level 1 instruction cache, a Level 1 data cache, a Level 2 cache, and a Level 3 cache. Cache 118 may be a separate chip or integrated into CPU 110. Main memory 130 may include a random access memory (RAM), such as a DRAM, of various sizes. Main memory 130 may be coupled to a secondary memory such as a hard disk, a flash memory, or an optical storage device. Memory controller 120 is an electronic circuit that manages the flow of data going to and from main memory 130. Memory controller 120 can be a separate chip or integrated into another chip, such as being placed on the same die or as an integral part of CPU 110. Cache 118 and main memory 130 may be collectively referred to as a physical memory. As described above, main memory 130 may include a page table for each virtual space allocated to a process.

Computer system 100 also includes an MMU 112 coupled to CPU 110 or integrated into CPU 110. MMU 112 may perform virtual memory management and virtual address translation, and handle memory protection, cache control, and bus arbitration. MMU 112 may be coupled to TLBs or include TLBs as part of MMU 112. A TLB is a memory cache that stores recent translations of virtual addresses to physical addresses for faster retrieval of address translations. A computer system may include small level 1 (L1) TLBs, such as L1 TLB 114 shown in FIG. 1, and a larger Level 2 (L2) TLB, such as L2 TLB 116 shown in FIG. 1. L1 TLB 114 may include an L1 instruction TLB and an L1 data TLB. An L1 instruction TLB or L1 data TLB may have, for example, 32 or 64 entries. A L2 TLB may have, for example, 1024 entries. TLBs, such as L1 TLBs, can be built directly into CPU 110 and can run at full CPU speed. Thus, if a translation can be found in a TLB such as an L1 TLB, a virtual memory access can execute just as fast as a direct physical memory access.

Figure 2:
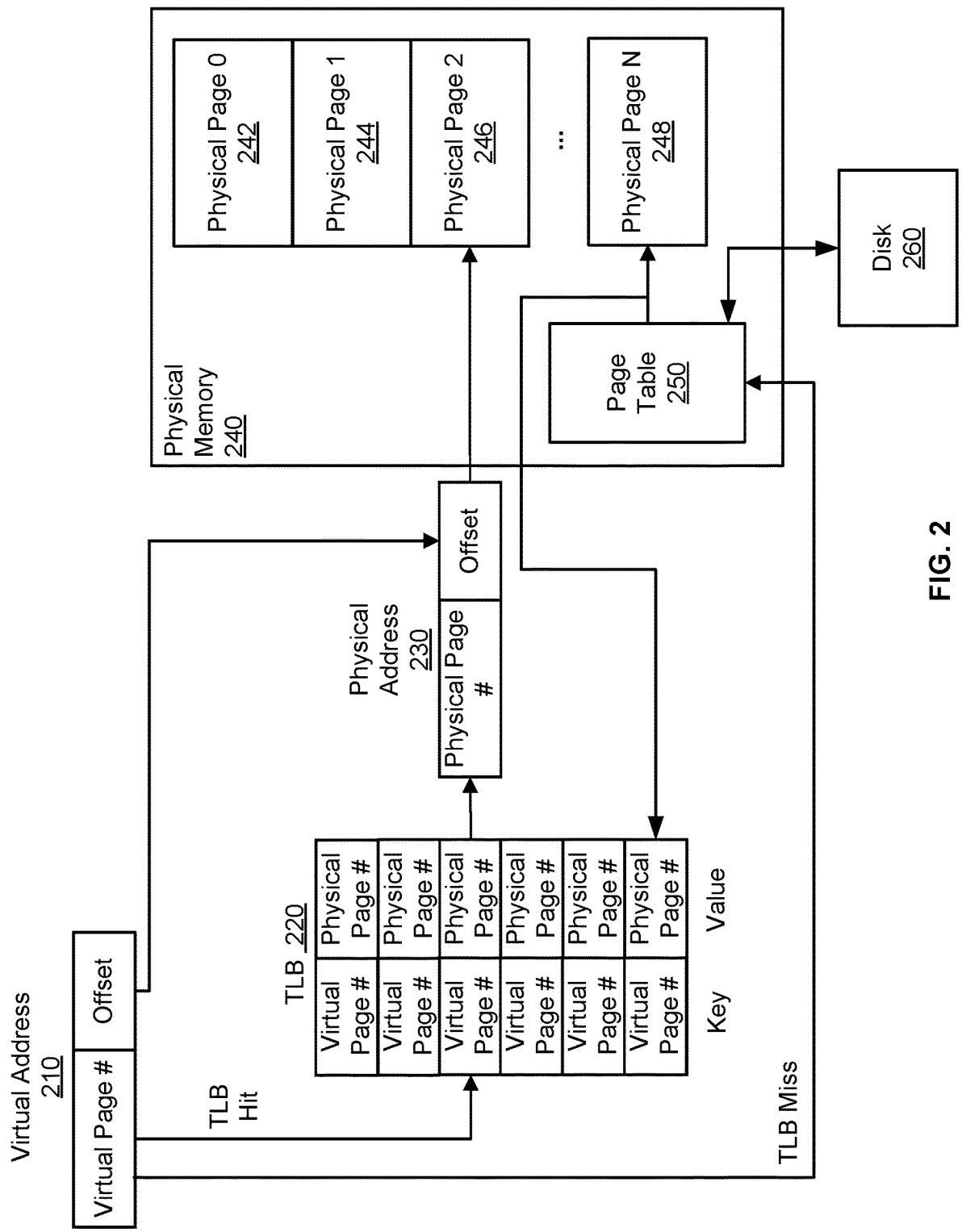
FIG. 2 is a block diagram illustrating example memory access flows using a TLB.

FIG. 2 is a block diagram illustrating example memory access flows using a TLB. A virtual address, for example, virtual address 210, may include a virtual page number, which is typically the upper virtual address bits, and an offset number (the bottom bits of the address) that specifies the offset within a page. To access virtual address 210, an MMU, such as MMU 112, searches TLB 220 for an entry that includes the virtual page number being accessed. If a TLB entry with a matching virtual page number is found, a TLB hit event occurs and the corresponding physical page number can be used with the offset number to determine the target physical address 230. Physical address 230 can then be used to access corresponding physical page 2 246 in physical memory 240, which includes other physical pages, such as physical page 0 242, physical page 1 244, physical page N 248, and a page table 250 for each process.

In systems with multiple levels of TLBs, if there is no TLB entry with a matching virtual page number in an L1 TLB, the MMU may search the matching virtual page number in an L2 TLB. If the matching virtual page number is found in the L2 TLB, the entry in the L2 TLB with the matching virtual page number may be filled from the L2 TLB into the L1 TLB, and the corresponding physical page number may be used to access the physical memory.

If there is no TLB entry with a matching virtual page number in any TLB, a TLB miss event occurs. When a TLB miss event occurs, the MMU may walk through page table 250 to find a matching PTE. If the matching PTE can be found, the MMU may load the matching PTE in the TLB. For example, the matching PTE may point to physical page N 248, and the matching PTE may be loaded into TLB 220. A TLB miss may also be handled by a software TLB miss handler, which may walk through the page table to find a matching PTE.

When a TLB is full but a new translation needs to be loaded into the TLB, the MMU may determine which existing entry should be evicted to make space for the new entry based on TLB replacement policies, such as some forms or variations of a least recently used (LRU) technique, where the TLB entry that has not been used for the longest time is the one that is evicted from the TLB.

If no matching PTE is found in page table 250, a page fault event occurs, which may indicate that the virtual address is invalid or the requested page is not loaded in the physical memory. The page fault is generally handled by a part of the operating system kernel. When handling a page fault, the operating system generally tries to make the requested page accessible in physical memory, or terminates the process in case of an illegal memory access. A page fault handler may search in a secondary storage, such as a hard disk 260, to find the requested page, which may then be loaded into the physical memory. Page table 250 and TLB 220 may then be updated accordingly.

Events occurring during the virtual memory access, such as TLB hits/misses, PTE load from the L2 TLB to the L1 TLB or from the page table to the L1 TLB, and page faults, may provide useful information for the operating system or the user application to optimize the memory usage. However, the TLBs are generally not accessible by a software program. Even if the TLBs can be accessible by a software program, software intervention may be needed to log the events occurring in the TLBs.

Techniques described herein include adding a TLB event logging circuit and a buffer that can be accessed by a software program to an MMU that translates between a logical address and a physical address. The TLB event logging circuit can be configured to detect any type of event occurring in the TLB and store information related to the detected events in the buffer. A software program can then read the information stored in the buffer, and use the information to improve the performance and reduce the cost of a memory subsystem in a computer system. The disclosed techniques may also be used in a virtual machine environment or an I/O device.

Figure 3:
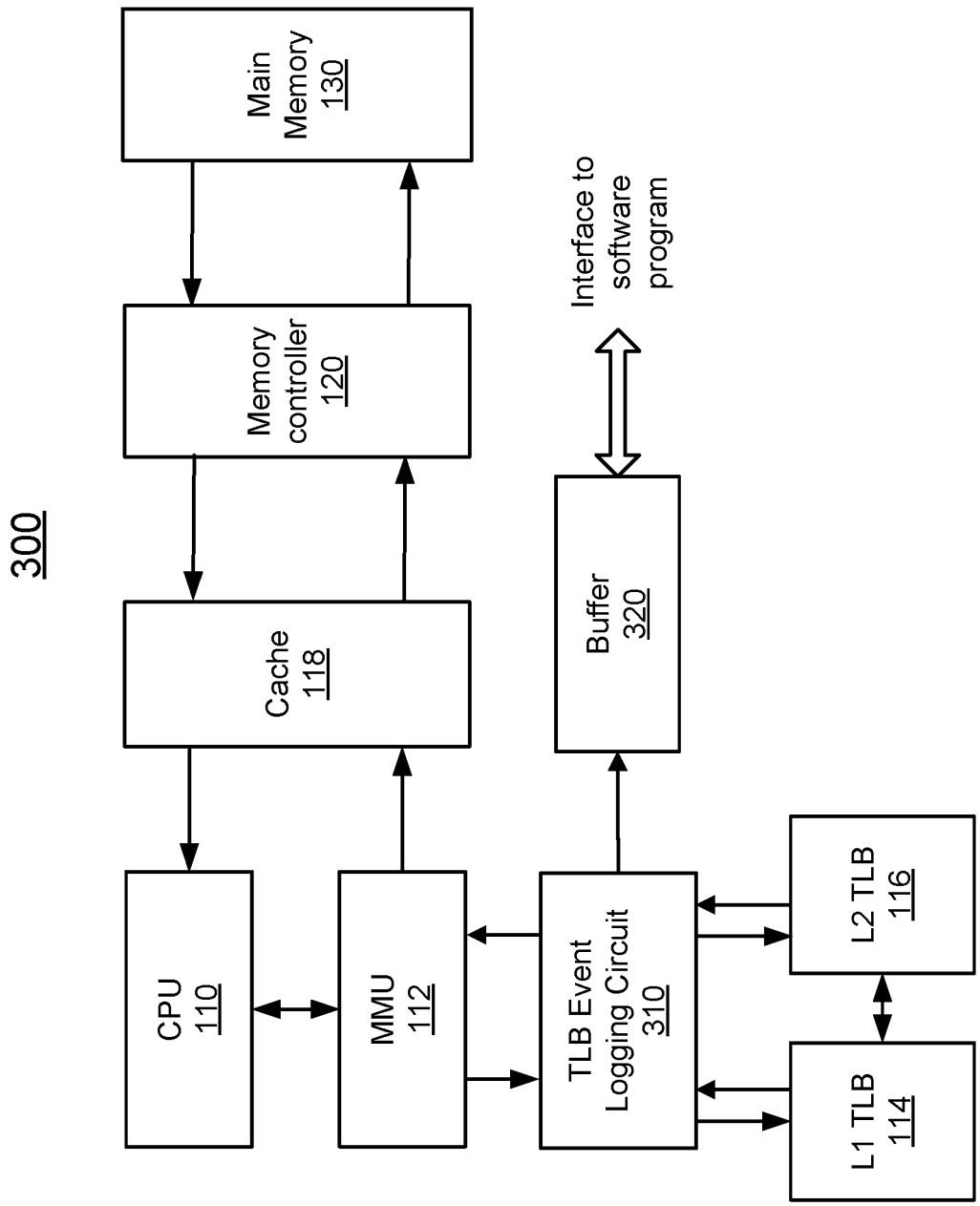
FIG. 3 is a block diagram of an example computer system with an example memory subsystem, according to some embodiments of this disclosure.

FIG. 3 is a block diagram of an example computer system 300 with an example memory subsystem according to some embodiments of this disclosure. As in computer system 100 described in FIG. 1, computer system 300 includes a CPU 110, a cache 118, a memory controller 120, and a main memory 130. Cache 118 and memory controller 120 may be separate devices or may be integrated into CPU 110. Cache 118 may include a cache hierarchy, such as a Level 1 instruction cache, a Level 1 data cache, and a Level 2 cache. Main memory 130 may include a random access memory (RAM), such as a DRAM.

Computer system 300 also includes an MMU 112 coupled to CPU 110 or integrated into CPU 110. MMU 112 may perform virtual memory management and virtual address translation, and handle memory protection, cache control, and bus arbitration. MMU 112 may be coupled to TLBs directly or indirectly, or include TLBs as part of MMU 112. The TLBs may include, for example, L1 TLB 114 and L2 TLB 116. L1 TLB 114 may include an L1 instruction TLB and an L1 data TLB. L1 TLB 114 may have, for example, 32 or 64 entries with a page size of for example, a few kilobytes to a few megabytes. A L2 TLB may have, for example, 1024 entries with a page size of, for example, a few kilobytes to a few megabytes.

An entry in the TLB may include a virtual address (VA) field that includes a virtual page number; a physical address (PA) field that includes a physical page number; a page-size field that indicates the page size a translation covers, for example, 4 KB, 64 KB, or 1 MB; and protection and memory attributes of the page. The TLB entry may also include a Dirty bit, which is set if the memory page has been modified since the last translation.

Just as with any other cache, care needs to be taken to avoid cases where the TLB contains stale entries that are no longer valid. Stale entries can result from a number of scenarios. For example, when a virtual page is removed from a physical memory to a disk, the PTE in the page table is marked as not present. If that page still has a TLB entry, the TLB entry is now stale. Similarly, a process might map a file into physical memory, access a few pages in the mapped area, and then unmap the file. At this point, the TLB may still contain entries that were inserted when the mapped area was accessed, but because the mapping no longer exists, those entries are now stale.

The event that causes the most stale entries occurs when a CPU switches from one process to another, i.e., a context switch. A context switch (also referred to as a process switch or a task switch) is the switching of a CPU from one process or thread to another. A context switch involves storing an execution context (state) of a process or thread so that the suspended process can be resumed from the same point at a later time. This enables multiple processes to share a single CPU and is an essential feature of a multitasking operating system.

Because each process has its own address space, the entire TLB may become stale on a context switch. Thus, a context switch may require that the entire TLB be flushed. Various techniques can be used to avoid this problem. For example, information used for matching a TLB entry may be expanded to include not just the virtual page number but also an address-space number that uniquely identifies the process or the address space to which the translation belongs. The CPU can also be extended to include a new register that identifies the currently executing process. A TLB entry may also include a process identifier (PID) field that identifies the executing process in order to distinguish which page table a TLB entry belongs to. A PID can be used by most operating system kernels, such as that of UNIX, Mac OS X, or Microsoft Windows, to uniquely identify a process running on a system. An entry in the TLB may only be used if the PID in the TLB entry matches the PID of the current process. With a PID, a TLB flush is not needed during a context switch. When the TLB is searched, the MMU ignores entries whose PID does not match the value in the CPU register. With this setup, a context switch may only require updating the CPU register, and no flushing is needed. Effectively, this makes it possible to share the TLB across multiple processes.

In a virtualized environment, the TLB entry may also include a HYP field that indicates whether the translated page belongs to a hypervisor layer or a virtual machine layer. In addition, in the virtualized environment, to ensure all virtual machines are identified properly, each virtual machine is assigned a universal unique virtual-Machine identifier (VIVID)) to identify the virtual machine that hosts the process. The VMID field permits virtual machine switches without TLB flushes. A TLB hit may occur only if the VIVID) in a TLB entry matches the current VMID.

As illustrated in FIG. 3, computer system 300 also includes a TLB event logging circuit 310 and a software-accessible buffer 320 coupled to TLB event logging circuit 310. Buffer 320 may include registers, static random access memory (SRAM), DRAM, RAM, flash memory, or other memory device. For example, buffer 320 may be a circular buffer in which the oldest data entry may be overwritten by a newest data entry. Buffer 320 may also be a first-in-first-out (FIFO) buffer. In one example, buffer 320 may be accessed using a write pointer and a read pointer.

Buffer 320 may include a few hundreds, a few thousands, a few tens of thousands or more entries. Buffer 320 may be accessible by an operating system or a user application. Buffer 320 may also be reset to clear all entries in it. Each entry in buffer 320 may include a timestamp of an event, the TLB entry associated with the event, and the event type, such as a TLB hit, TLB entry fill, or TLB entry eviction.

TLB event logging circuit 310 may be implemented in various locations to log events occurring in the TLBs along with the associated timing information into buffer 320. For example, TLB event logging circuit 310 may be disposed between MMU 112 and the TLBs. In some embodiments, TLB event logging circuit 310 may be a part of MMU 112 or a part of the TLBs, and located at the interface between MMU 112 and the TLBs. In some embodiments, a separate TLB event logging circuit may be used for each TLB, such as L1 TLB 114 and L2 TLB 116, and located at the interface between MMU 112 and each TLB.

TLB event logging circuit 310 may be configured to log different events occurring in the TLBs. For example, TLB event logging circuit 310 may be configured to log all TLB events for all TLBs for a CPU, or TLB events for one or more TLBs. TLB event logging circuit 310 may be configured to log TLB events based on other criteria, such as the type of event or different combinations of various types of event.

For example, TLB event logging circuit 310 may be configured to log any events for a TLB, including any access to the TLB by MMU 112, such as TLB reads, TLB writes (fills), TLB hits, TLB misses, etc. As described above, to read from or write to a virtual address, an MMU searches the TLB for the virtual page number of the page that is being accessed. If a TLB entry with the matching virtual page number is found and other fields in the TLB entry, such as the PID and VMID, also match the current process and virtual machine identifiers, a TLB hit event occurs; otherwise a TLB miss event occurs.

In a system including multiple levels of TLB, such as L1 TLB 114, which may include an L1 instruction TLB and an L1 data TLB, and unified L2 TLB 116, events for different TLBs may be detected and logged. For example, event types such as L1 or L2 TLB hit, L1 or L2 TLB miss, L1 TLB fill, L1 TLB eviction, L2 TLB fill, L2 TLB eviction, may be detected and recorded.

To read from or write to a virtual memory address for a process, MMU 112 may search the L1 instruction TLB or L1 data TLB first. If a matching virtual page number is found in an entry in the L1 instruction TLB or L1 data TLB and other fields in the matching TLB entry, such as the PID and VMID, also match the current process and virtual machine identifiers, a L1 TLB hit event occurs. TLB event logging circuit 310 may detect this event, and write the content of the matching TLB entry to buffer 320. TLB event logging circuit 310 may also write information, such as the type of the event (L1 TLB hit), the identifier of the CPU (CPU ID) making the request for memory access, the time when the L1 TLB hit event occurs, and whether the access to the memory page is for read or write, to buffer 320.

If there is no L1 TLB hit, an L1 TLB miss event occurs. TLB event logging circuit 310 may detect this event, and write information such as the virtual address requested, the CPU ID, the PID, and/or VMID to buffer 320. TLB event logging circuit 310 may also write information, such as the type of the event (L1 TLB miss), the time when the L1 TLB miss event occurs, to buffer 320.

When an L1 TLB miss event occurs, MMU 112 may search the matching virtual page number, PID, and/or VMID in L2 TLB 116. If a matching entry is found in L2 TLB 116, an L2 TLB hit even occurs. Upon detection of this event, TLB event logging circuit 310 may write information, such as the type of the event (L2 TLB hit), the time of occurrence of the event, the CPU ID, and the content of the matching entry, to buffer 320.

When an L2 TLB hit occurs, the matching entry in L2 TLB 116 may be written into L1 TLB 114, and an L1 TLB fill from L2 TLB event occurs. If L1 TLB 114 is not full, the matching entry in L2 TLB 116 may be written into an available space in L1 TLB 114. TLB event logging circuit 310 may write information associated with the event, such as the type of the event (L1 TLB fill from L2 TLB), the time of occurrence of the event, the CPU ID, and the content of the matching entry, to buffer 320.

If L1 TLB 114 is full before the matching entry in L2 TLB 116 is written into L1 TLB 114, an entry in L1 TLB 114 may be evicted from L1 TLB 114. L1 TLB 114 may use algorithms, such as least recently used (LRU), most recently used (MRU), least frequently used (LFU), and random replacement (RR) algorithms, to select an L1 TLB entry and evict the selected L1 TLB entry from L1 TLB 114. When the selected L1 TLB entry is evicted from L1 TLB 114, an L1 TLB eviction event occurs. TLB event logging circuit 310 may detect this event and write information associated with the event, such as the type of the event (L1 TLB eviction), the time of occurrence of the event, the CPU ID, and the content of the evicted L1 TLB entry, to buffer 320. The evicted L1 TLB entry may be discarded or written into L2 TLB 116 if it does not exist in L2 TLB 116.

If no matching TLB entry is found in L2 TLB 116, an L2 TLB miss event occurs. TLB event logging circuit 310 may detect this event, and write information such as the virtual address requested, the CPU ID, the PID, and/or the VMID to buffer 320. TLB event logging circuit 310 may also write information such as the type of the event (L2 TLB miss) and the time when the L2 TLB miss event occurs to buffer 320.

When an L2 TLB miss event occurs, MMU 112 may walk a page table, such as page table 250 of FIG. 2, to find a matching PTE. If the matching PTE can be found and is marked as present, MMU 112 may load the matching PTE into L1 TLB 114 and/or L2 TLB 116. When the matching PTE is loaded into L1 TLB 114, an L1 TLB fill from page table event occurs. TLB event logging circuit 310 may detect this event and write information associated with the event, such as the type of the event (L1 TLB fill from page table), the time of occurrence of the event, the CPU ID, and the content of the matching entry, to buffer 320. As described above, an L1 TLB eviction event may occur if L1 TLB 114 is full when the matching PTE is written in L1 TLB 114.

When the matching PTE is loaded into L2 TLB 116, an L2 TLB fill event occurs. TLB event logging circuit 310 may detect this event and write information associated with the event, such as the type of the event (L2 TLB fill), the time of occurrence of the event, the CPU ID, and the content of the matching entry, to buffer 320. As described above with respect to L1 TLB, if L2 TLB 116 is full before the matching PTE is written into L2 TLB 116, an existing entry in L2 TLB 116 may be evicted, using algorithms such as LRU, LFU, MRU, and RR. When an L2 TLB entry is evicted from L2 TLB 116, an L2 TLB eviction event occurs. TLB event logging circuit 310 may detect this event and write information associated with the event, such as the type of the event (L2 TLB eviction), the time of occurrence of the event, the CPU ID, and the content of the evicted L2 TLB entry, to buffer 320.

If no matching PTE is found in page table 250, a page fault event occurs, which may indicate that the virtual address is invalid or the page is not located in the physical memory. Upon the detection of a page fault, TLB event logging circuit 310 may log the type of event (page fault) and the CPU ID. Because no entry is found in the TLB, TLB event logging circuit 310 may only log the requested VA, VMID, and PID into buffer 320.

TLB event logging circuit 310 may also detect and log TLB events such as TLB entry invalidation by software. TLB entry invalidation is a process where entries in the TLB are deleted. During a process switch (i.e., address space switch), some TLB entries can become invalid because the virtual-to-physical address mapping is different for different processes. A TLB may be completely flushed and the TLB becomes empty after a switch. After the flush, any memory access will cause a TLB miss, and it will take some time before the TLB is refilled. With, for example, a PID or address space number (ASN) tagged on the TLB entries, TLB entries that do not have an ASN or PID matching the current process are considered valid and may still be kept in the TLB for later use.

In some embodiments, instead of logging individual events or in addition to logging individual events, TLB event logging circuit 310 may log statistical information of events into buffer 320. For example, TLB event logging circuit 310 may include integrated statistical counters per page or per TLB entry. A statistical counter may count the number of times a type of event, such as TLB hit, memory read, memory write, occurs for a page or a TLB entry during a period of time. TLB event logging circuit 310 may write the content of the page or TLB entry and the number of times the type of event has occurred to buffer 320. In some embodiments, a type of event may occur frequently and the integrated statistical counter may not be large enough because of size limitation, the integrated statistical counter may overflow. If a counter overflows, TLB event logging circuit 310 may write the content of the associated TLB entry and information indicating that a counter overflows to buffer 320.

TLB event logging circuit 310 may be configured to detect and log various combinations of different types of event. The selection of the types of event to be detected and logged may be done by, for example, setting registers for TLB event logging circuit 310. For example, one register bit may associate with one type of event. To select the type of event for detection and logging, the corresponding register bit may be set. Multiple or all register bits may be set to detect and log multiple or all types of TLB event. The configuration of TLB event logging circuit 310 may be done through, for example, a bus interface, such as a serial bus, or through MMU 112.

As discussed above, when an event occurs, the time of occurrence of the event is also recorded, using, for example, a system or master clock, and written to buffer 320 together with other information related to the event. In other words, each event recorded in buffer 320 may be time stamped. The timing information of the events may be used for, for example, determining the frequency of a type of TLB event or how often a page is used, and correlating between TLB events or between TLB events and other events of the computer system. For example, an interface to a software program (such as the hypervisor or kernel) may be provided in system 300. The interface may be configured to log software activities associated with a memory page, such as page-fault handling, context switch, page pinning (locking a page in physical memory), page reclamation, and the associated timing information into a buffer, such as buffer 320. The TLB events and the software activities can be correlated using the associated timing information.

Because buffer 320 may be accessible by software and may include physical page numbers, a software program (such as a hypervisor or kernel) may read the buffer and use the information in a DRAM cache replacement algorithm. For example, the software program may determine the physical pages that are currently loaded in the cache, and keep a page if it is frequently used or if it will be used in the current process even if it was associated with a process that is not currently active.

A software program, a firmware, or a hardware that is programmable (running user firmware or not) can be implemented to read data stored in buffer 320, and extract information from the data. For example, the state of a page in a life-cycle may be profiled, and the page can be categorized as a "hot page" that is currently used by the CPU for code or data execution, or a "cold page" that was evicted from L2 TLB and has not been refilled back to the TLBs. Other information, such as real-time page granule and memory footprint estimation, page sharing per CPU Core, per VMID, per processor, or between different CPU Cores, and L1 TLB and L2 TLB hit profiles over time, may also be extracted from the data stored in the buffer. Information in the buffer regarding each TLB entry, for example, the information provided by the integrated statistics counters in TLB event logging circuit 310, can be used to profile whether a page is read-only, mostly write, hot, or cold.

The extracted information may be used to optimize memory usage, improve the performance of the memory system, or reduce cost of the memory system. For example, in one embodiment, data in memory pages that are least frequently used can be moved from DRAM to slower memory device, such as a hard disk.

The above described techniques can also be used in an input/output memory management unit (IOMMU) for translations between I/O device addresses and physical memory addresses. An IOMMU is a memory management unit that may connect a direct memory access-capable (DMA-capable) I/O device to the main memory. Like an MMU for a CPU that translates CPU-visible virtual addresses to physical memory addresses, the IOMMU may map device-visible virtual addresses (i.e., device addresses or I/O addresses) to physical addresses. The IOMMU may also provide memory protection against malicious devices that attempt DMA attacks and faulty devices that attempt errant memory transfers. An IOMMU may also use TLBs to store recent translations. Events occurred in IOMMU TLB for I/O devices can be logged to profile memory pages used by the I/O device using techniques described above. Similarly, events occurred in an IOMMU TLB for a pass-through device can also be logged to profile individual virtual machine (VM) page usage pattern.

Figure 4:
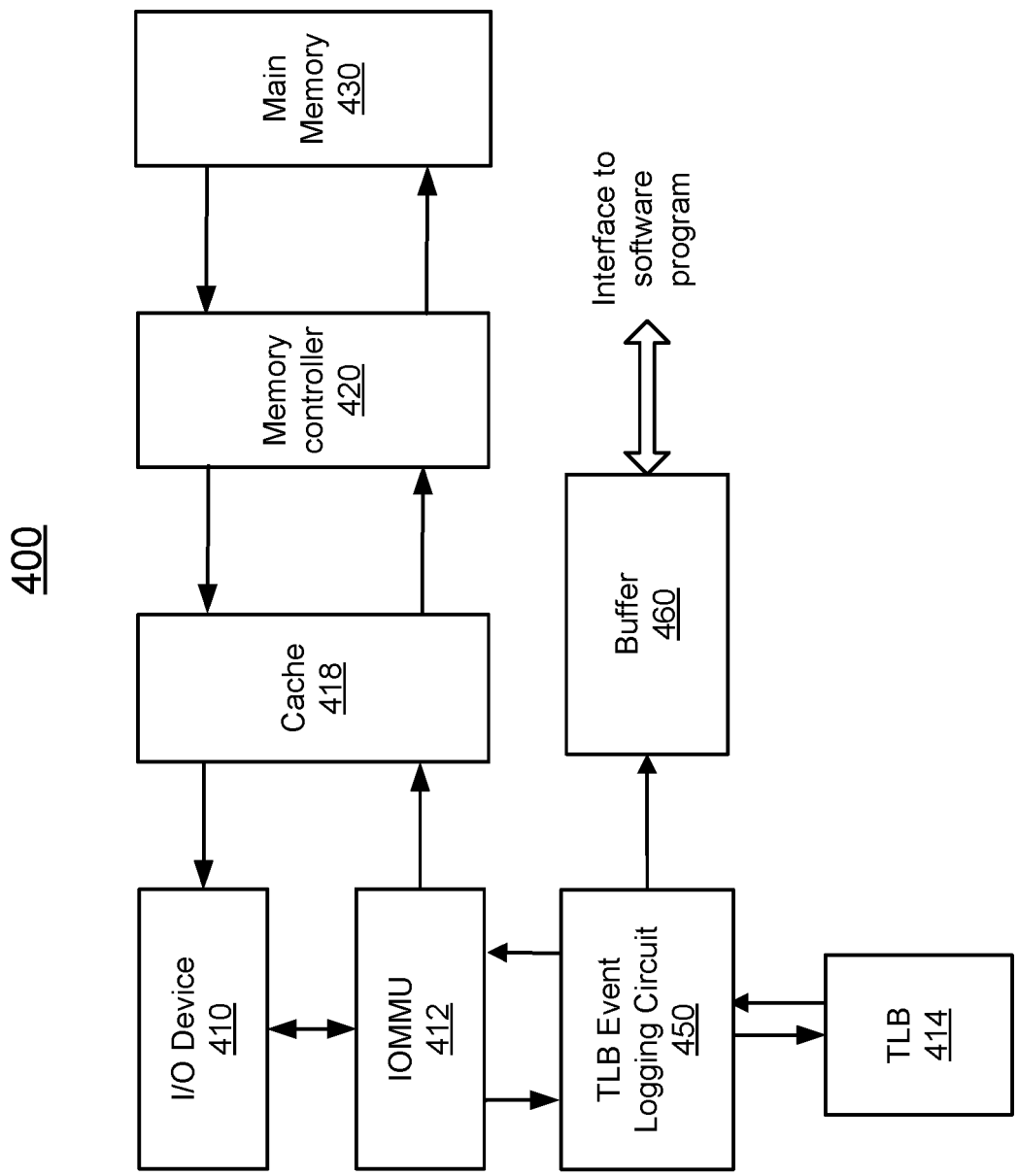
FIG. 4 is a block diagram of an example computer system with an example I/O Device, according to some embodiments of this disclosure.

FIG. 4 is a block diagram of an example computer system 400 with an example I/O device according to some embodiments of this disclosure. As in computer system 300 described in FIG. 3, computer system 400 may include a cache 418, a memory controller 420, and a main memory 430. Cache 418 may include a cache hierarchy, such as a Level 1 cache and a Level 2 cache. Main memory 130 may include a random access memory (RAM), such as a DRAM.

Computer system 400 may also include an IOMMU 412 coupled to I/O device 410 or integrated into I/O device 410. IOMMU 412 may perform translations between device addresses and physical memory addresses, and handle memory protection and bus arbitration. MMU 412 may be coupled to a TLB 414 directly or indirectly, or include TLB 414 as a part of MMU 412. As in computer system 300, TLB 414 may also include a small L1 TLB and a larger L2 TLB.

Computer system 400 also includes a TLB event logging circuit 450 for detecting and logging information of events related to TLB 414. TLB event logging circuit 450 may perform similar functions as TLB event logging circuit 310 of FIG. 3 and may be implemented in a way similar to the way TLB event logging circuit 310 of FIG. 3 is implemented. The information of events related to TLB 414 may be stored in a buffer 460, which may be accessible by software. As with buffer 320, buffer 460 may be implemented as a circular buffer, register, static random access memory (SRAM), DRAM, RAM, flash memory, or other memory device.

Figure 5:
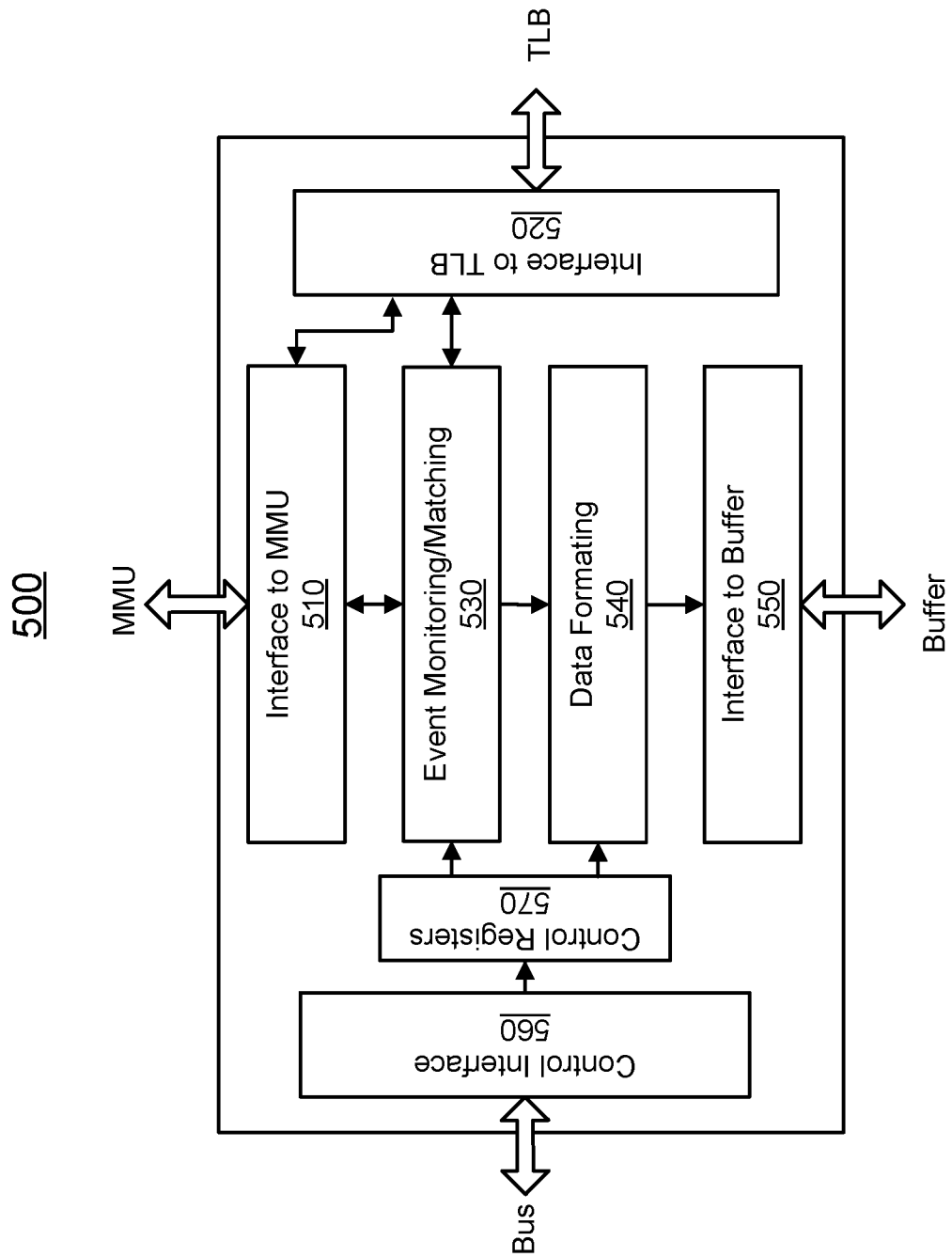
FIG. 5 is a block diagram of an example TLB event logging circuit.

FIG. 5 is a block diagram of an example TLB event logging circuit 500 that may be used as TLB event logging circuit 310 of FIG. 3 or TLB event logging circuit 450 of FIG. 4. TLB event logging circuit 500 may include an interface to MMU circuit 510 and an interface to TLB circuit 520. TLB event logging circuit 500 may communicate with an MMU, such as MMU 112 of FIG. 3 or IOMMU 412 of FIG. 4, through interface to MMU circuit 510, and communicate with a TLB, such as L1 TLB 114 and L2 TLB 116 of FIG. 3 or TLB 414 of FIG. 4, through interface to TLB circuit 520. When an MMU accesses a TLB, the MMU may send the access request to the TLB directly and pass the information associated with the access to the TLB event logging circuit 500 through interface to MMU circuit 510. Alternatively, the MMU may access the TLB through interface to MMU circuit 510 and interface to TLB circuit 520. Similarly, the TLB may communicate with the MMU directly and pass information related to any TLB transaction to TLB event logging circuit 500 through interface to TLB circuit 520. Alternatively, the TLB may communicate with the MMU through interface to MMU circuit 510 and interface to TLB circuit 520.

TLB event logging circuit 500 may also include an event monitoring and matching circuit 530 that is coupled to interface to MMU circuit 510 and interface to TLB circuit 520. When the TLB and the MMU communicate through interface to MMU circuit 510 and interface to TLB circuit 520, or pass information related to TLB transactions to TLB event logging circuit 500 through interface to MMU circuit 510 and interface to TLB circuit 520, event monitoring and matching circuit 530 may monitor the TLB transactions, and record a transaction that matches a type of TLB event to be detected. In addition, as described above, event monitoring and matching circuit 530 may also include one or more counters that can count the number of times a type of TLB event has occurred with respect to a TLB entry.

The type of event to be detected and/or counted may be set by setting control registers 570 in TLB event logging circuit 500 through a control interface 560. A software program may select the types of event to be detected and/or counted, and program control registers 570 using control interface 560 through a bus, such as a parallel bus or a serial bus. For example, control registers 570 may include one bit for each type of TLB event, and a type of TLB event may be selected by setting the corresponding bit to "1".

TLB event logging circuit 500 may also include a data formatting circuit 540 that can generate data to be written into a buffer, such as buffer 320 of FIG. 3 or buffer 460 of FIG. 4, according to a format determined by the setting in control registers 570 for a type of event or a predetermined format for a type of event. For example, information associated with a TLB event as described above with respect to FIG. 3 may be formatted into a 16-byte message before it is written into the buffer.

TLB event logging circuit 500 may also include an interface to buffer circuit 550. Information associated with a TLB event may be written to the buffer in the determined format through interface to buffer circuit 550. Interface to buffer circuit 550 may be a parallel interface or a serial interface. In some implementations, information associated with a TLB event may be stored in a FIFO before it is written into the buffer through interface to buffer circuit 550.

TLB event logging circuit 500 may also include a local timer or clock (not shown in FIG. 5) or may have access to a master clock or system clock. TLB event logging circuit 500 may capture the time information related to the time when a TLB event occurred using the local clock or system clock, and include the time information in the information associated with the TLB event.

It is noted that, in various implementations, some circuits in TLB event logging circuit 500 may be divided, combined, or omitted. In some embodiments, additional circuits, such as additional registers, FIFOs, and counters, may be included in TLB event logging circuit 500.

Figure 6:
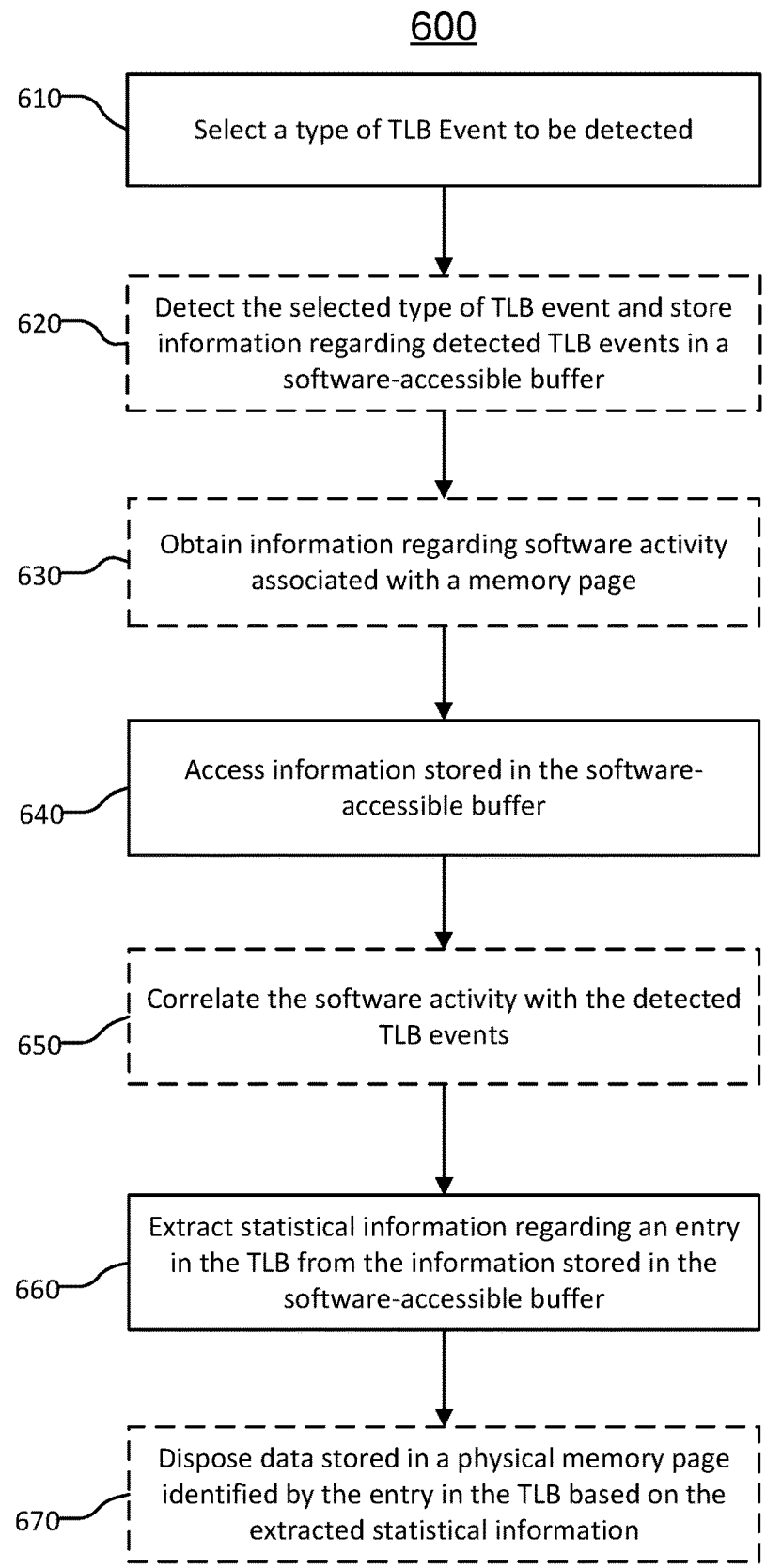
FIG. 6 is a flow chart illustrating an example process, according to some embodiments of the present disclosure.

FIG. 6 is a flow chart illustrating an example process 600, according to some embodiments of the present disclosure. Some or all of process 600 (or any other processes described herein, or variations, and/or combinations thereof) may be performed under the control of one or more electronic circuits, and/or under the control of one or more computer systems configured with executable instructions (e.g., software or firmware instructions, or one or more computer programs). The instructions can be executed by a processor or other circuitry. The instructions may be stored on a computer-readable storage medium. The computer-readable storage medium may be non-transitory.

At block 610, a user or a software program, such as a hypervisor, a kernel, or a user application, may select a type of TLB event to be monitored and recorded using a TLB event logging circuit, such as TLB event logging circuit 310 or 450, which is operable to detect the selected type of TLB event and store information regarding detected TLB events in a software-accessible buffer, such as buffer 320 or 460. The type of TLB event to be monitored and recorded may be selected based on a specific application. In some embodiments, all TLB events may be monitored and recorded. To select a type of TLB event, the software program may set one or more register bits corresponding to the type of event in TLB event logging circuit 310 or 450.

Optionally, at block 620, when configured, a TLB event logging circuit, such as TLB event logging circuit 310 or 450, may detect the selected type of TLB event and store information regarding detected TLB events in the software-accessible buffer, such as buffer 320 or 460. As described above, the data to be logged into the software-accessible buffer may include statistical information regarding certain events.

Optionally, at block 630, information regarding software activity associated with a memory page may be obtained, for example, through an interface to a software program, such as a hypervisor or kernel, as described above with respect to FIG. 3. The software activity may include, for example, page-fault handling, context switch, page pinning, and page reclamation.

At block 640, a software program, such as a hypervisor, a kernel, or a user application may read information stored in the software-accessible buffer through, for example, a bus such as a serial bus or a parallel bus.

Optionally, at block 650, the software program may correlate the software activity with the detected TLB events using, for example, timing information of the software activity and the detected TLB events.

At block 660, the software program may extract statistical information regarding an entry in the TLB from the information stored in the software-accessible buffer. The statistical information may include, but is not limited to, for example, the number of TLB accesses, the number of TLB hits, the time period a page is used, and the number of reads and/or writes. Additionally or alternatively, statistical information regarding all detected events, such as the number of TLB accesses, the number of TLB hits, the number of TLB misses, the number of L1 TLB fills, the number of L1 TLB evictions, the number of L2 TLB fills, the number of L2 TLB evictions, and the number of page faults, may be extracted.

Optionally, at block 670, data stored in a physical memory page identified by the entry in the TLB may be disposed of based on the extracted statistical information regarding the entry to optimize memory usage, improve the performance of a memory system, or reduce cost of a memory system. For example, as described above, data in memory pages that are least frequently used can be moved from a DRAM to a slower memory, such as a hard disk. As another example, the DRAM cache replacement algorithm may be improved based on the extracted information as described above.

It is noted that even though FIG. 6 describes the example process as a sequential process, many of the operations can be performed in parallel. In addition, the order of the operations may be rearranged. An operation may have additional steps not included in the figure. Some operations may be optional, and thus may be omitted in various embodiments. Furthermore, embodiments of the process may be implemented in hardware, software, firmware, middleware, microcode, hardware description languages, or any combination thereof.

Figure 7:
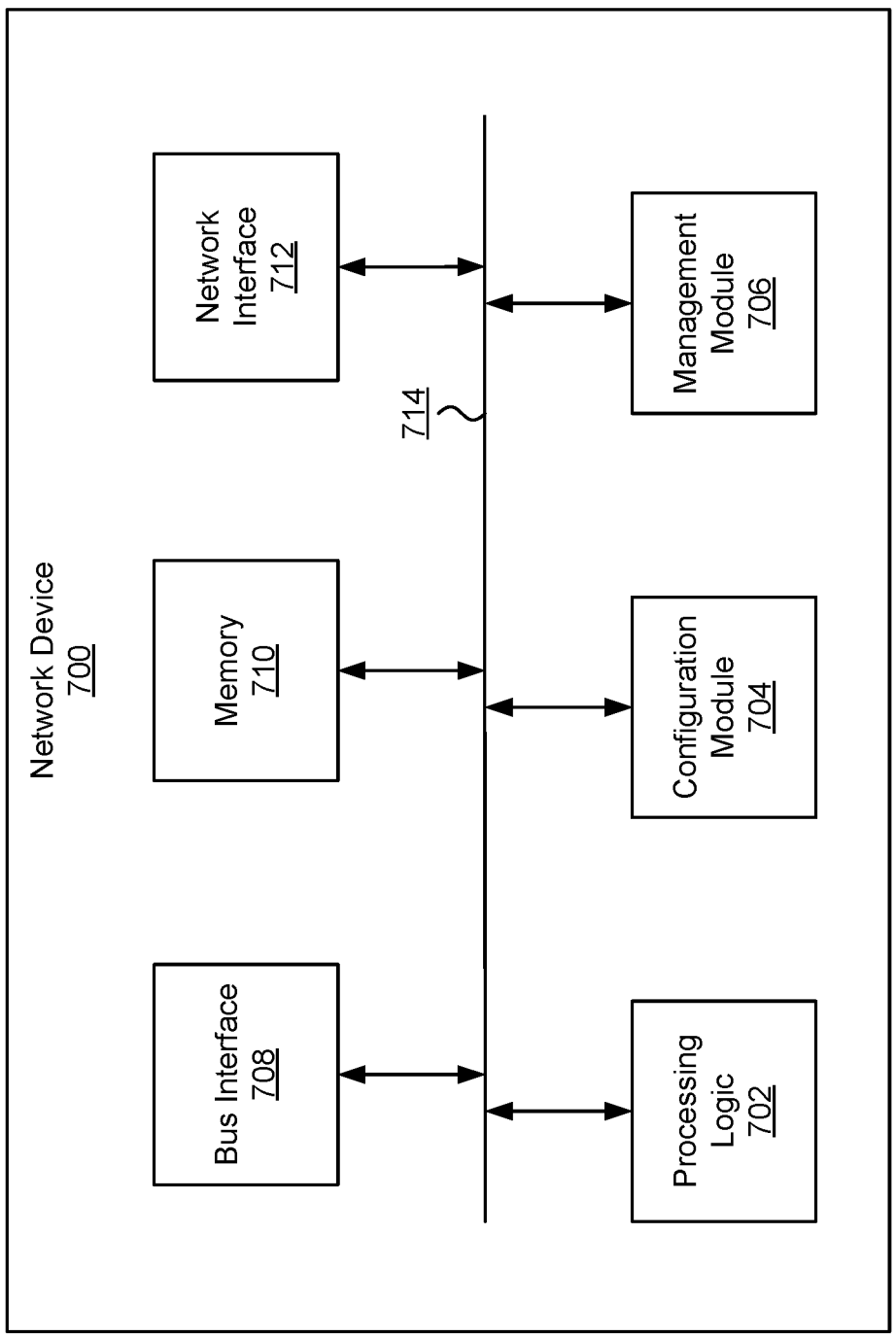
FIG. 7 illustrates an example architecture for features and systems described herein that includes one or more service provider computers and/or a user device connected via one or more networks, according to some embodiments.

FIG. 7 illustrates an example of a network device 700. Functionality and/or several components of the network device 700 may be used without limitation with other embodiments disclosed elsewhere in this disclosure, without limitations. A network device 700 may facilitate processing of packets and/or forwarding of packets from the network device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 700 may be the recipient and/or generator of packets. In some implementations, the network device 700 may modify the contents of the packet before forwarding the packet to another device. The network device 700 may be a peripheral device coupled to another computer device, a switch, a router or any other suitable device enabled for receiving and forwarding packets.

In one example, the network device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The network device 700 may include additional modules, not illustrated here, such as components discussed with respect to the nodes disclosed in FIG. 7. In some implementations, the network device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include ASICs, FPGAs, SoCs, network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network device 700, while in other cases some or all of the memory may be external to the network device 700. The memory 710 may store an operating system comprising executable instructions that, when executed by the processing logic 702, provides the execution environment for executing instructions providing networking functionality for the network device 700. The memory may also store and maintain several data structures and routing tables for facilitating the functionality of the network device 700.

In some implementations, the configuration module 704 may include one or more configuration registers. Configuration registers may control the operations of the network device 700. In some implementations, one or more bits in the configuration register can represent certain capabilities of the network device 700. Configuration registers may be programmed by instructions executing in the processing logic 702, and/or by an external entity, such as a host device, an operating system executing on a host device, and/or a remote device. The configuration module 704 may further include hardware and/or software that control the operations of the network device 700.

In some implementations, the management module 706 may be configured to manage different components of the network device 700. In some cases, the management module 706 may configure one or more bits in one or more configuration registers at power up, to enable or disable certain capabilities of the network device 700. In certain implementations, the management module 704 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the network device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), ATM, token ring, frame relay, High Level Data Link Control (HDLC), Fiber Distributed Data Interface (FDDI), and/or Point-to-Point Protocol (PPP), among others. In some implementations, the network device 700 may include multiple network interface modules, each configured to communicate with a different network. For example, in these implementations, the network device 700 may include a network interface module for communicating with a wired Ethernet network, a wireless 802.11 network, a cellular network, an Infiniband network, etc.

The various components and modules of the network device 700, described above, may be implemented as discrete components, as an SoC, as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 7.

Figure 8:
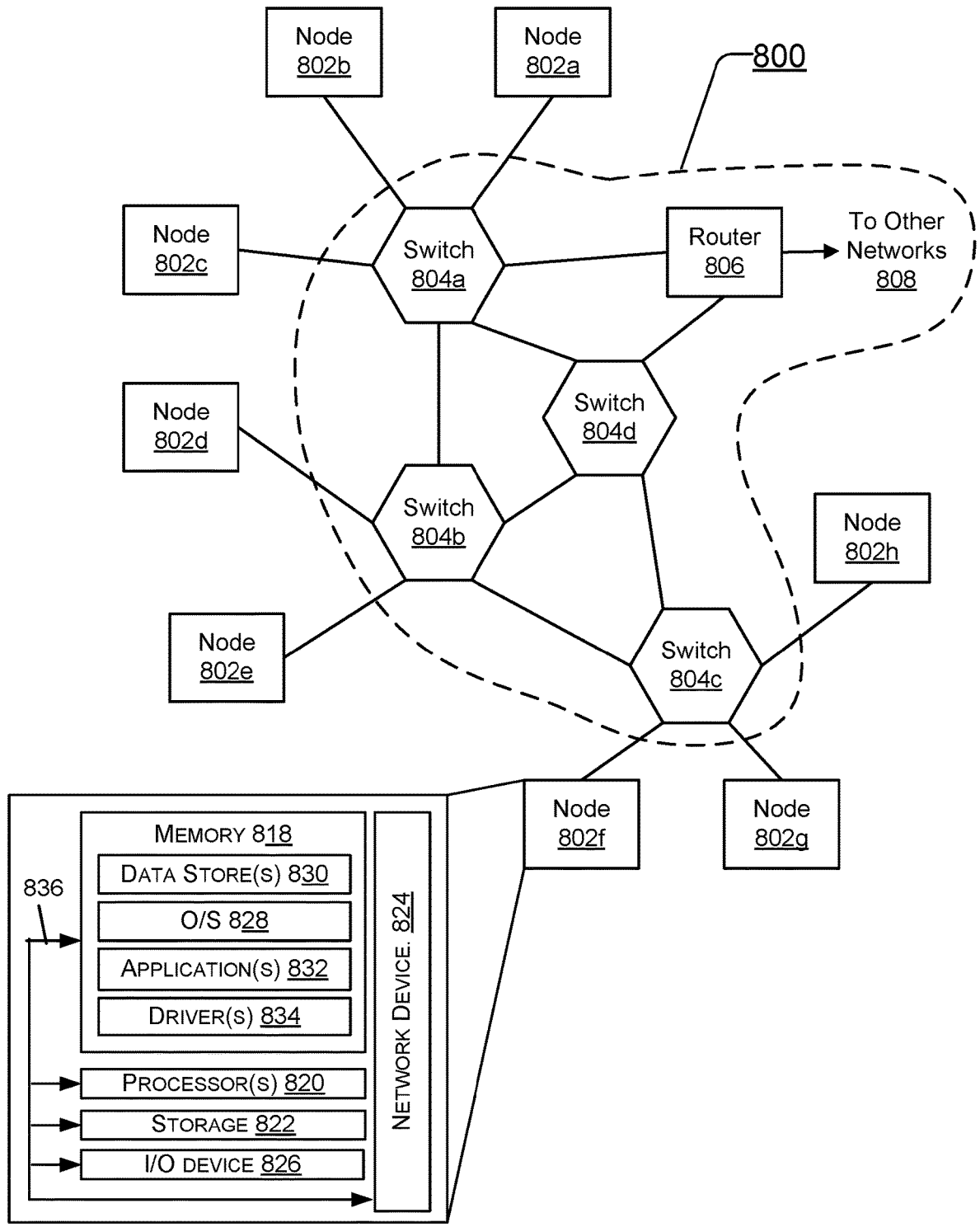
FIG. 8 illustrates aspects of an example environment of a computing system for implementing aspects in accordance with some embodiments.

FIG. 8 illustrates a network 800, depicting various types of network devices 700 of FIG. 7, such as nodes comprising the network device, switches and routers. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device 700 that filters and forwards packets between local area network (LAN) segments may be referred to as a switch. Switches generally operate at the data link layer (layer 2) and sometimes the network layer (layer 3) of the Open System Interconnection (OSI) Reference Model and may support several packet protocols. Switches 804a-804d may be connected to a plurality of nodes 802a-802h and provide multiple paths between any two nodes.

The network 800 may also include one or more network devices 700 for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources.

These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate.

The communication channel or channels 836 may take the form of a bus, a ring, a switching fabric, or a network.

The node(s) 802a-802h may also contain network device(s) 826 that allow the node(s) 802a-802h to communicate with a stored database, another computing device or server, user terminals and/or other devices on the network(s) 800. The network device(s) 824 of FIG. 8 may include similar components discussed with reference to the network device 700 of FIG. 7.

In some implementations, the network device 826 is a peripheral device, such as a PCI-based device. In these implementations, the network device 826 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 708 may implement NVMe, and the network device 826 may be connected to a computing system using a PCIe interface.

A PCI-based device may include one or more functions. A "function" describes operations that may be provided by the network device 826. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 826 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer system, comprising:
a physical memory subsystem;
a software-accessible hardware buffer separate from the physical memory subsystem; and
a processor coupled to the physical memory subsystem, the processor comprising:
  a memory management unit (MMU) configured to translate a virtual memory address into a physical memory address for accessing the physical memory subsystem, the MMU including:
  a translation lookaside buffer (TLB) configured to store a plurality of entries, each entry including a translation between a virtual memory page address and a physical memory page address; and
  a TLB event logging circuit configured to detect an event associated with an entry that is stored in the TLB and store information regarding the detected event in the software-accessible hardware buffer without software intervention, wherein the event includes an activity or a state of the TLB,
  wherein the processor is configured to execute a software program operable to access the information stored in the software-accessible hardware buffer and improve usage of the physical memory subsystem based on the information, and
  wherein an entry in the software-accessible hardware buffer includes: a type of an event that occurred for a TLB entry, a time of occurrence of the event, and a virtual address, a physical address, and a process identifier in the TLB entry.

2. The computer system of claim 1, further comprising:
an interface to the software program, the interface configured to log software activities associated with a memory page into the software-accessible hardware buffer.

3. The computer system of claim 1,
wherein the TLB event logging circuit is configured to detect a predetermined type of event that occurred to the TLB.

4. An apparatus comprising:
a memory management unit (MMU) configured to translate a logical memory address to a physical memory address for accessing a physical memory;
a translation lookaside buffer (TLB) configured to store a plurality of entries, each entry including a logical memory page address and an associated physical memory page address;
a software-accessible hardware buffer separate from the physical memory;
a TLB event logging circuit configured to detect an event associated with an entry that is stored in the TLB and store information regarding the detected event in the software-accessible hardware buffer without software intervention; and
a processor configured to execute a software program operable to access the information stored in the software-accessible hardware buffer and improve usage of the physical memory based on the information,
wherein an entry in the software-accessible hardware buffer includes: a type of an event that occurred for a TLB entry, a time of occurrence of the event, and a virtual address, a physical address, and a process identifier in the TLB entry.

5. The apparatus of claim 4,
wherein the logical memory address is a virtual memory address used by a software process or a device memory address used by an input/output device.

6. The apparatus of claim 4,
wherein the MMU includes the TLB and the TLB event logging circuit.

7. The apparatus of claim 4,
wherein the software-accessible hardware buffer is a circular buffer.

8. The apparatus of claim 4,
wherein the TLB event logging circuit is configured to detect a predetermined type of event associated with the TLB and store information regarding the detected predetermined type of event in the software-accessible hardware buffer.

9. The apparatus of claim 4,
wherein the TLB event logging circuit is configured to determine a number of times a type of event occurred for an entry in the TLB.

10. The apparatus of claim 4,
wherein the TLB includes multiple levels of TLB; and
wherein the TLB event logging circuit is configured to detect events occurring at the multiple levels of the TLB.

11. The apparatus of claim 4, further comprising:
an interface to the software program, the interface configured to log software activity associated with a memory page.

12. The apparatus of claim 11, wherein the apparatus is configured to correlate the detected event with the software activity based on a time of occurrence of the detected event included in the information regarding the detected event.

13. The apparatus of claim 4, wherein the TLB event logging circuit includes:
a control interface for selecting the event to be detected;
an event matching circuit configured to detect the event; and
a data formatting circuit configured to format the information regarding the detected event according to a predetermined format.

14. The apparatus of claim 4,
wherein a type of the event detected by the TLB event logging circuit includes page faults, loading translations into the TLB, evicting translations from the TLB, translation invalidations, TLB hits, or TLB misses.

15. A computer-implemented method, comprising:
selecting, by a computer system, a type of translation lookaside buffer (TLB) event to be detected for a TLB, the TLB associated with a physical memory;
detecting, by a TLB event logging circuit, only TLB events of the selected type of TLB event that are associated with entries stored in the TLB;
storing, without software intervention, by the TLB event logging circuit, information regarding the detected TLB events in a software-accessible hardware buffer, the software-accessible hardware buffer separate from the physical memory;

accessing, by the computer system, information stored in the software-accessible hardware buffer;

extracting, by the computer system, statistical information regarding an entry in the TLB from the information stored in the software-accessible hardware buffer; and executing, by the computer system, a software program operable to access the information stored in the software-accessible hardware buffer and improve usage of the physical memory based on the information, wherein an entry in the software-accessible hardware buffer includes:
- a type of an event that occurred for a TLB entry,
- a time of occurrence of the event, and
- a virtual address, a physical address, and a process identifier in the TLB entry.

16. The computer-implemented method of claim 15, wherein the type of TLB event includes page faults, loading translations into the TLB, evicting translations from the TLB, translation invalidations, TLB hits, or TLB misses.

17. The computer-implemented method of claim 15, further comprising:

moving data stored in a physical memory page of the physical memory to a memory with slower access time than the physical memory based on the extracted statistical information.

18. The computer-implemented method of claim 15, further comprising:

obtaining information regarding software activity associated with a memory page; and correlating the software activity with the detected TLB events based on the information stored in the software-accessible hardware buffer.

19. The computer-implemented method of claim 15, wherein the TLB is a TLB for a central processing unit (CPU), an input/output device, or a virtual machine.

20. The computer-implemented method of claim 15, wherein the TLB includes multiple levels of TLB; and wherein the TLB event logging circuit is configured to detect events occurring at the multiple levels of the TLB.

* * * * *